United States Patent
Zee et al.

(10) Patent No.: US 8,929,248 B2
(45) Date of Patent: Jan. 6, 2015

(54) TOPOLOGY DETERMINATION IN A COMMUNICATIONS NETWORK

(75) Inventors: Oscar Zee, Stockholm (SE); Tomas Nylander, Varmdo (SE); Jari Vikberg, Jarna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 632 days.

(21) Appl. No.: 13/128,321

(22) PCT Filed: Oct. 28, 2009

(86) PCT No.: PCT/EP2009/064203
§ 371 (c)(1),
(2), (4) Date: May 9, 2011

(87) PCT Pub. No.: WO2010/052157
PCT Pub. Date: May 14, 2010

(65) Prior Publication Data
US 2011/0222436 A1   Sep. 15, 2011

Related U.S. Application Data

(60) Provisional application No. 61/112,796, filed on Nov. 10, 2008.

(51) Int. Cl.
| | | |
|---|---|---|
| *H04L 12/28* | (2006.01) | |
| *H04L 12/56* | (2006.01) | |
| *H04W 24/02* | (2009.01) | |
| *H04L 29/12* | (2006.01) | |
| *H04L 12/24* | (2006.01) | |
| *H04W 92/20* | (2009.01) | |

(52) U.S. Cl.
CPC ......... *H04W 24/02* (2013.01); *H04L 29/12547* (2013.01); *H04L 41/12* (2013.01); *H04L 61/2582* (2013.01); *H04L 29/12226* (2013.01); *H04L 61/2015* (2013.01); *H04W 92/20* (2013.01)

USPC .......................................................... 370/254

(58) Field of Classification Search
None
See application file for complete search history.

(56) References Cited

U.S. PATENT DOCUMENTS 6,006,272 A * 12/1999 Aravamudan et al. ........ 709/245
8,140,051 B2 * 3/2012 Yuuki .......................... 455/404.2
(Continued)

FOREIGN PATENT DOCUMENTS

EP    1903816 A1    3/2008

OTHER PUBLICATIONS

3rd Generation Partnership Project (3GPP), "3rd Generation Partnership Project; Technical Specification Group Radio Access Network; Evolved UniversalTerrestrial Access Network (E-UTRAN); S1 Application Protocol (S1AP)(Release 8)" 3GPP; TS 36.413 V1.1.0, Oct. 2007, 63 pages.

(Continued)

*Primary Examiner* — Ayaz Sheikh
*Assistant Examiner* — Blanche Wong
(74) *Attorney, Agent, or Firm* — Rothwell, Figg, Ernst & Manbeck, P.C.

(57) ABSTRACT

There is provided a method of determining the topology of a base station in a communications network. The base stations sends a configuration request message to a configuration node, and subsequently receives from the configuration node a configuration response message, the configuration response message including topology information relating to the base station. This topology information can be used in allowing the base station to most efficiently set up a communication with another base station.

20 Claims, 7 Drawing Sheets

(56) References Cited

U.S. PATENT DOCUMENTS

2004/0131057 A1* 7/2004 Miyashita .................. 370/389
2011/0004672 A1* 1/2011 Garcia-Martin et al. ..... 709/220
2011/0237258 A1* 9/2011 Nylander et al. ............ 455/437

OTHER PUBLICATIONS

3rd Generation Partnership Project (3GPP), "3rd Generation Partnership Project; Technical Specification Group Service and System Aspects; Security of H(e)NB;(Release 8)" 3GPP, TR 33.820 v1.1.0, Sep. 2008, 42 pages.
Ericsson: "Terminology Correction of ANR," R3-082821, 3rd Generation Partnership Project (3GPP) TSG-RAN Wg3 Meeting #61bis, Sep. 30-Oct. 3, 2008, 8 pages.
European Telecommunications Standards Institute (ETSI), "Universal Mobile Telecommunications System (UMTS) Evolved Universal Terrestrial Radio Access (E-UTRA) and Evolved Universal Terrestrial Radio Access Network (E-UTRAN); Overall description; Stage 2, (3GPP TS 36.300 version 8.6.0 Release 8)"; ETSI TS 136 300, ETSI Standard, Oct. 2008, 141 pages.
Huawei: "Discussion on ANR IP lookup alternative"; R3-082546; 3rd Generation Partnership Project (3GPP) TSG RAN WG3 Meeting #61bis, Sep. 30-Oct. 3, 2008, 3 pages.
Motorola: "Requirements and Evaluation of options for IP address Discovery to support X2 Setup," R3-082978, 3rd Generation Partnership Project (3GPP) TSG RAN3 #63, Nov. 10-14, 2008, 3 pages.
Nortel: "ANR Neighbors IP address lookup and establishment" R3-081226, 3rd Generation Partnership Project (3GPP) TSG-RAN WG3 meeting #60, May 5-9, 2008, 5 pages.
QUALCOMM Europe, et al., "Discovery of neighbor eNB IP address," R3-082456, 3rd Generation Partnership Project (3GPP) TSG-RAN WG3 #61bis, Sep. 30-Oct. 3, 2008, 3 pages.
English Translation of Chinese Office Action dated Jun. 9, 2013 from Application No. CN 200980145603.8; 6 pages.
English Translation of Second Office Action issued in Chinese Patent Application No. 200980145603.8, 7 pages (Dec. 3, 2013).
English Translation of Search Report issued in Chinese Patent Application No. 200980145603.8, 2 pages.

* cited by examiner

TOPOLOGY DETERMINATION IN A COMMUNICATIONS NETWORK

CROSS REFERENCE TO RELATED APPLICATION(S)

This application is a 35 U.S.C. §371 National Phase Entry Application from PCT/EP2009/064203, filed Oct. 28, 2009, and designating the United States and also claims the benefit of U.S. Provisional Application No. 61/112,796, filed Nov. 10, 2008, the disclosures of which are incorporated herein in their entirety by reference.

TECHNICAL FIELD

The invention relates to the field of topology determination in a communications network, and in particular to topology determination of a base station.

BACKGROUND

Long Term Evolution (LTE) is a communication network technology currently under development by the 3rd Generation Partnership Project (3GPP). LTE requires a new radio access technique termed Evolved Universal Terrestrial Radio Access Network (E-UTRAN), which is designed to improve network capacity, reduce latency in the network, and consequently improve the end-user's experience. System Architecture Evolution (SAE) is the core network architecture for LTE communication networks.

Figure 1:
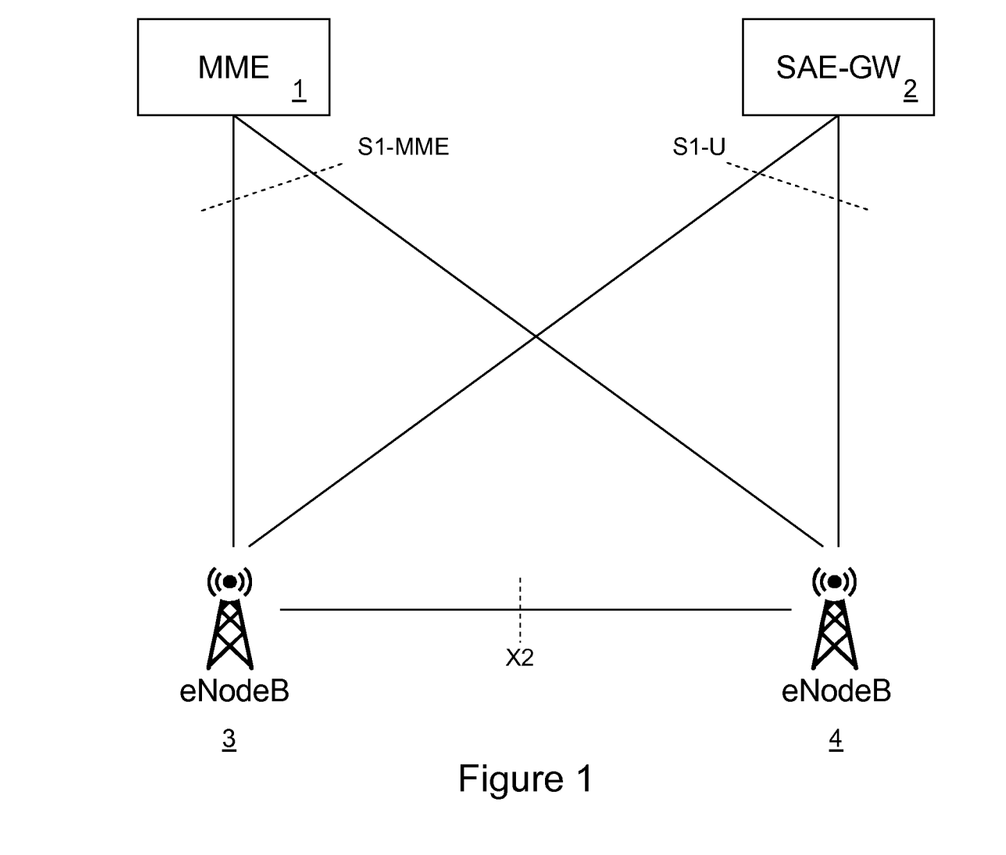
FIG. 1 illustrates schematically in a block diagram an LTE/SAE network architecture.

Referring to FIG. 1, the LTE/SAE architecture includes a Mobility Management Entity (MME) 1, which is responsible for control signalling. An SAE Gateway (SAE-GW) 2 is responsible for the user data. The SAE-GW 2 consists of two different parts, namely a Serving Gateway that routes user data packets, and a PDN Gateway that provides connectivity between a user device and an external data network. These nodes are described in detail in 3GPP Technical Specification (TS) 23.401. All these nodes are interconnected by an IP network. Further nodes are the eNodeBs 3, 4, which act as base stations in the network. There are three major protocols and interfaces between these node types. These are S1-MME (between the eNodeBs 3, 4 and the MME 1), 51-U (between the eNodeBs 3, 4 and the SAE-GW 2, or more correctly between the eNodeBs 3, 4 and the Serving Gateway), and X2 (between eNodeBs 3, 4). The corresponding protocols used in these interfaces are S1AP (51 Application Protocol) and X2AP (X2 Application Protocol). All these protocols and interfaces are IP-based. In addition, the network may contain other nodes that are part of the above interface, for example a Home eNodeB Gateway (HeNB GW) between a HeNB and rest of the nodes in the network.

Figure 2:
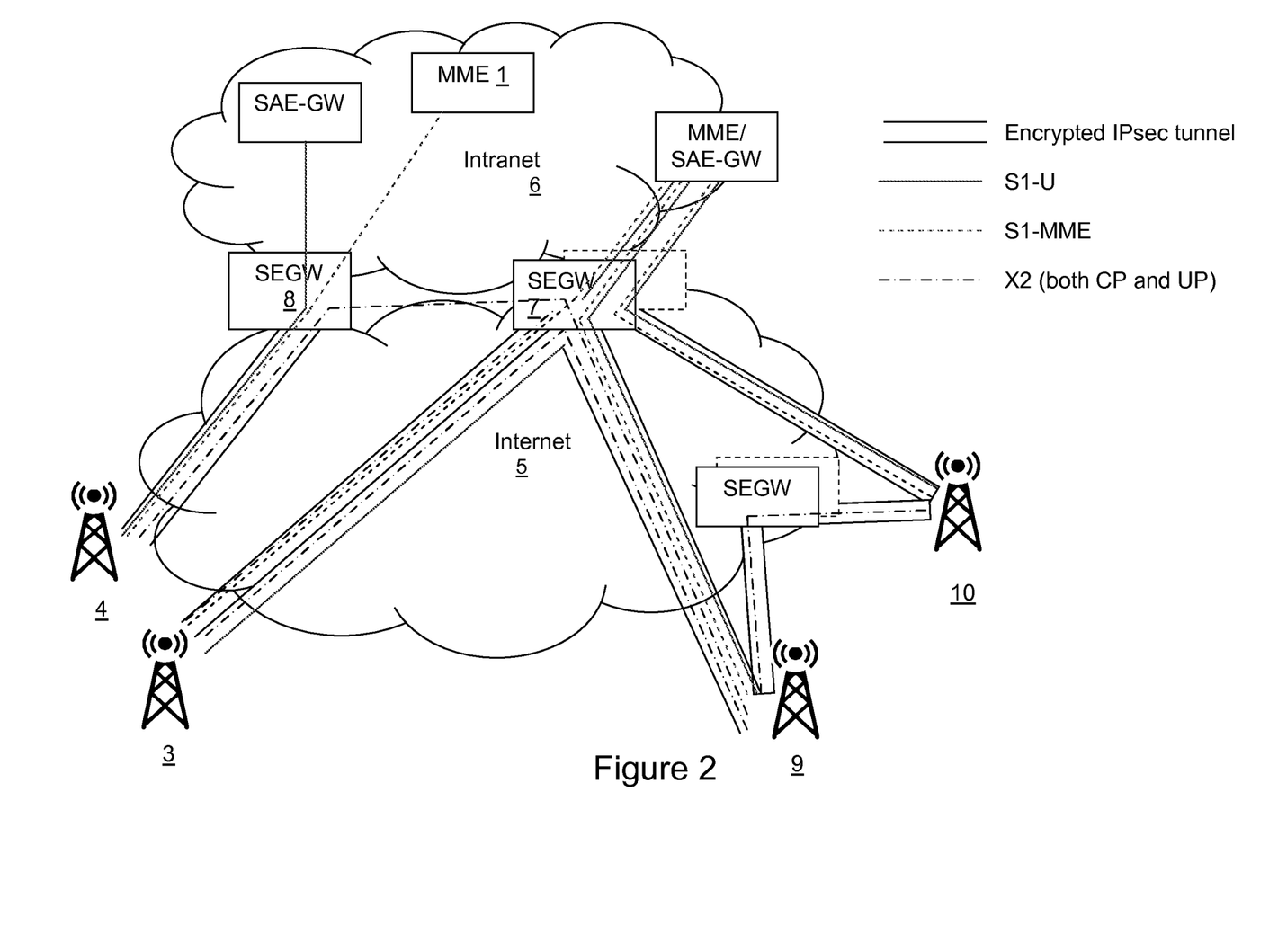
FIG. 2 illustrates schematically in a block diagram LTE/SAE interconnection of eNodeBs with other nodes.

Referring to FIG. 2, a network operator commonly connects the eNodeBs on a LTE Radio Access Network (RAN) towards it's internal network (Intranet 6), where the SAE Core Network (SAE CN) is located, by hiring transport capacity with a certain Service Level Agreement (SLA) (e.g. specific bandwidth and QoS support) from an ISP (Internet Service Provider). This hired transport capacity is treated as un-secure since the traffic will be mixed with traffic from other users and may traverse through parts of Internet 5 or other unsecured areas. Core network nodes may be located in a secured intranet 6 (a so-called trusted domain). In order to provide a secured communication between an eNodeB 3 and the Intranet 6, a security gateway (SEGW) 7 is introduced as an interface between unsecured Internet 5 and the secure intranet 6. IPsec tunnels are used in order to connect the eNodeB 3 towards the Intranet 6 via the SEGW 7.

FIG. 2 illustrates further examples when eNodeBs 3, 4, 9, 10, connecting via the Internet 5, are connected to the SAE CN nodes using IPsec tunnels towards the SEGWs 7, 8. The S1-MME and the S1-U connections are established over the IPsec tunnels. It is also shown that an X2 interface between two eNodeBs can traverse either through one or two SEGW(s) depending on if the eNodeBs are connected to the same or to different SEGW(s). For example, an X2 interface between eNodeB 3 and eNodeB 9 traverses a single SEGW 7, whereas an X2 between eNodeB 4 and eNodeB 9 traverses two SEGWs, i.e. SEGW 8 and SEGW 7.

There are several factors which can affect the pricing of the hired transport capacity. These factors include bandwidth, QoS and the number of public IP addresses provided. In order to minimize the need for public IP addresses, an eNodeB 3 can be located behind a firewall that uses Network Address Translation (NAT). Due to using NAT, the IPsec setup must be done with the following features in order to bypass the NAT and make it possible for the eNodeB 3 to communicate with the SEGW 7 and the nodes in the intranet:

Tunnel mode
Encapsulating Security Payload (ESP)
UDP encapsulation of IPsec ESP Packets (RFC 3948)
Intranet IP address allocation during the IPsec tunnel establishment, for example via IKEv2 signalling or Dynamic Host Configuration Protocol (DHCP)

Figure 3:
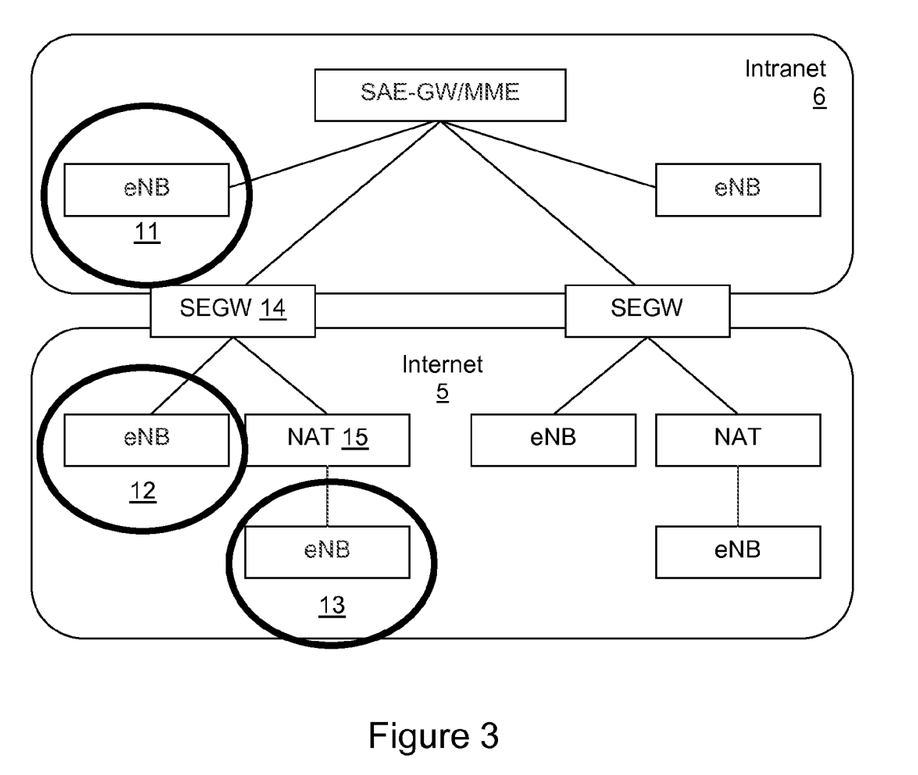
FIG. 3 illustrates schematically in a block diagram examples of different topology locations of eNodeBs.

There are several different possibilities for eNodeB topology locations that are important in relation to the establishment of the X2 interface. These are illustrated in FIG. 3, and can be described as follows:

An eNodeB 11 is located in the same secure domain (i.e. intranet 6) as the core network nodes and some other eNodeBs.

An eNodeB 12 is located in the Internet 5 with no NAT. As the eNodeB 12 is located outside the secure domain 6 in the Internet 5, in order to access the secure domain, eNodeB 12 needs to establish an IPsec tunnel towards the SEGW 14.

An eNodeB 13 is located in the Internet 5 and behind a NAT 15. eNodeB 13 is located outside the secure domain 6 in the Internet 5. eNodeB 13 may be located behind a NAT 15 in order to reduce the number of used public IP addresses (or for other reasons). In this case, an IPsec tunnel is also needed between eNodeB 13 and the SEGW 14.

Figure 4:
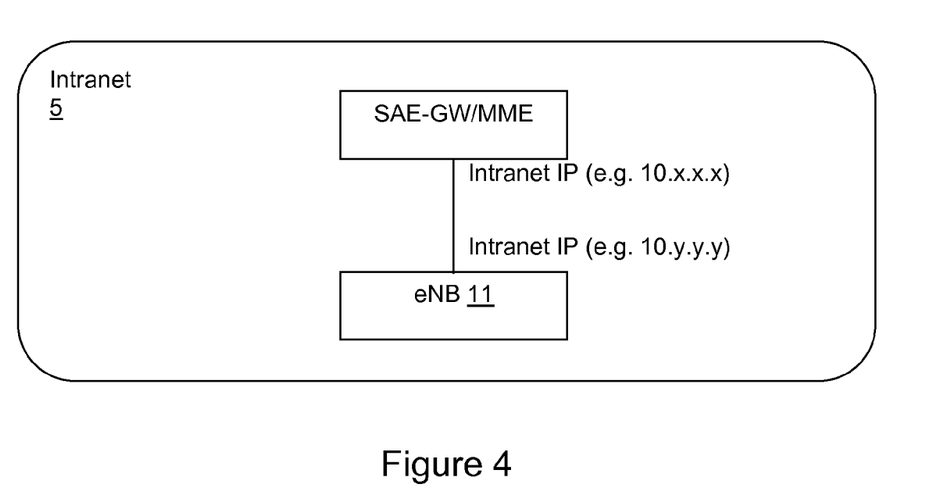
FIG. 4 illustrates schematically in a block diagram a network architecture when an eNodeB is located in an Intranet.

The different topology locations also mean that different types of IP addresses will be used. These are described below:

FIG. 4 illustrates the example where eNodeB 11 is located in the Intranet 6. In this case, eNodeB has one Intranet IP address, which may be statically allocated or retrieved by an internal DHCP server (shown as "e.g. 10.y.y.y" in FIG. 4). This Intranet IP address is used for communication to core network nodes and towards other eNodeBs.

Figure 5:
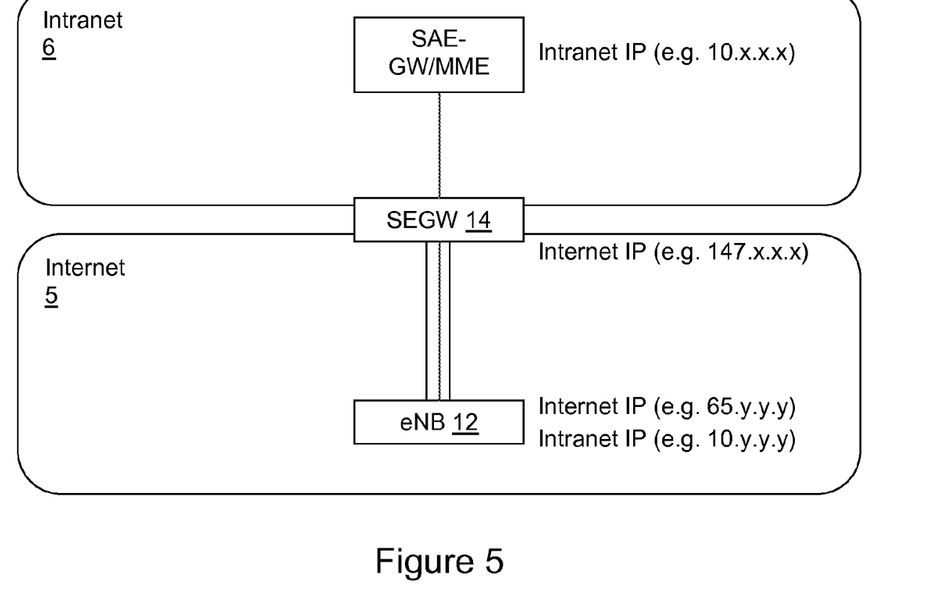
FIG. 5 illustrates schematically in a block diagram a network architecture when an eNodeB is located in an Internet without a NAT.

When an eNodeB 12 is located in the Internet 5 with no NAT, as illustrated in FIG. 5 herein, it has two different IP addresses; one Internet IP address and one Intranet IP address. The network setup is done in the following way:

1. eNodeB 12 retrieves its Internet IP address via, for example, an external DHCP server located in the Internet (shown as "e.g. 65.y.y.y" in FIG. 5).
2. eNodeB 12 finds the SEGW 14 Internet IP address via a DNS server located in the Internet (shown as "e.g. 147.x.x.x" in FIG. 5).
3. eNodeB 12 establishes an IPsec tunnel towards the SEGW 14.

4. eNodeB 12 retrieves its Intranet IP address during the IPsec tunnel establishment, for example via IKEv2 signalling or DHCP (shown as "e.g. 10.y.y.y" in FIG. 5).

The Intranet IP address is used for communication with core network nodes and towards other eNodeBs.

Figure 6:
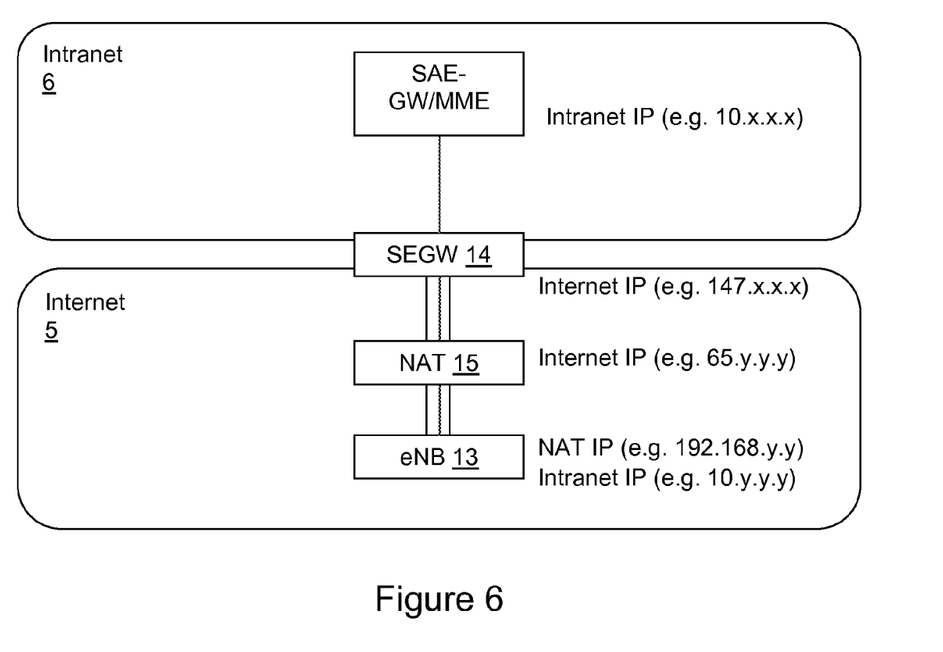
FIG. 6 illustrates schematically in a block diagram a network architecture when an eNodeB is located behind a NAT in an Internet.

When an eNodeB 13 is located behind a NAT at the Internet, as illustrated in FIG. 6 herein, three IP addresses are involved in the setup process; namely a NAT IP address, an Internet IP address and an Intranet IP address. The network setup is done in the following way:

1. The NAT 15 retrieves its Internet IP address, for example via a DHCP server located at the Internet (shown as "e.g. 65.y.y.y" in FIG. 6).
2. eNodeB 13 retrieves its NAT IP address, for example via a DHCP server located at the NAT firewall (shown as "e.g. 192.168.y.y" in FIG. 6).
3. eNodeB 13 finds the SEGW 14 Internet IP address via a DNS server located in the Internet 5 (shown as "e.g. 147.x.x.x" in FIG. 6).
4. eNodeB 13 establishes an IPsec tunnel towards the SEGW 14 using UDP encapsulation as the NAT 15 is detected during IPsec tunnel establishment.
5. eNodeB 13 retrieves its Intranet IP address during the IPsec tunnel establishment, for example via IKEv2 signalling or DHCP (shown as "e.g. 10.y.y.y" in FIG. 6).

The Intranet IP address is used for communication with core network nodes and towards other eNodeBs.

Different techniques can be used to establish an X2 interface between eNodeBs on IP transport network level. The location of the eNodeBs affects which method of establishing an X2 interface with another eNodeB is the most suitable.

SUMMARY

There is currently no way for an eNodeB to determine its topology in the network, or the topology of another eNodeB. This information can be critical in determining which technique should be used for establishing an X2 interface between eNodeBs. It is an object of the invention to overcome this problem.

According to a first aspect of the invention, there is provided a method of determining the topology of a base station in a communication network. The base station sends a configuration request message to a configuration node, and receives a response from the configuration node information that contains information relating to the base station topology. This information can subsequently be used to assist the base station in determining a process by which to set up a communication with another base station.

As an option, the topology information includes an indication of whether the base station is located at an Intranet or an Internet location.

The configuration node optionally retrieves the topology information from a database. The configuration node optionally determines whether a source or a destination IP address used in the configuration request message is an Intranet IP address or an Internet IP address. From this, a determination can be made whether the base station is located in an Intranet or an Internet location accordingly. In the event that it is determined that the base station is located at an Internet location, a further determination is made to ascertain whether the base station communicates with a Security Gateway node via a Network Address Translation function. This further determination is made during Internet Key Exchange between the base station and the Security Gateway node using Network Address Translation detection payload.

The base station optionally receives from a Security Gateway, an Intranet IP address for the Security Gateway node in an Internet Key Exchange signalling message. The Intranet IP address for the Security Gateway node indicates that the base station is located behind a Network Address Translation function, which is further topology information. The Intranet IP address for the Security Gateway node is optionally received either in a Configuration Payload, or in response to the base station sending an Internet Key Exchange informal message including a request for the Intranet IP address for the Security Gateway node.

The obtained topology information relating to the base station is optionally sent to a remote database.

As a further option, the method further comprises sending a lookup message from the base station to a remote database, the lookup message requesting topology information relating to a further base station. A response message is received from the remote database, the response message including the requested topology information relating to the further base station.

The obtained topology information is optionally stored at the base station, and a message is sent via an S1 interface to a further base station, the message including the topology information. The message is optionally sent using a transparent container such that the core network does not act upon information contained in the message.

Optional examples of the types of base station that can use the method described above include an eNodeB, a Home eNodeB, a UMTS Terrestrial Radio Access Network NodeB, a UMTS Terrestrial Radio Access Network combined NodeB and RNC, and a UMTS Terrestrial Radio Access Network Home NodeB.

An optional example of a configuration node is a Software Management Repository Service server.

According to a second aspect of the invention, there is provided a base station for use in a communication network. The base station is provided with a transmitter for sending a configuration request message to a remote configuration node, and a receiver for receiving from the remote configuration node information relating to the base station topology.

As an option, the topology information includes an indication whether the base station is located at an Intranet or an Internet location.

The base station is optionally provided with a processor arranged to, in the event that the base station is located at an Internet location, determine whether the base station communicates with a Security Gateway node via a Network Address Translation function using a Network Address Translation detection payload.

A memory is optionally provided for storing topology information relating to the base station.

As an option, the transmitter is arranged to send topology information relating to the base station to a remote database. As a further option, the transmitter is further arranged to send topology information relating to the base station to a further base station.

According to a third aspect of the invention, there is provided a Software Management Repository Service server for use in a communication network. The Software Management Repository Service server is provided with a receiver for receiving from a base station a configuration request message. A processor is provided for determining whether the base station is located at an Internet or an Intranet location, and a transmitter is provided for sending to the base station the results of the determination.

The processor is optionally arranged to determine whether the base station is located at an Internet or an Intranet location by determining whether a source IP address in the configuration request message is an Internet IP address or an Intranet IP address. As an alternative option, the processor is arranged to determine whether the base station is located at an Internet or an Intranet location by querying a database. The query may be made using the source IP address in the configuration request message as a key.

According to a fourth aspect of the invention, there is provided a method of establishing an interface between two base stations in a communication network. Topology information is determined for each of the base stations, and the determined topology information for each of the base stations is stored in a memory. The stored topology information is used to select one process from a number of possible processes of establishing the interface, and then the interface is established using the selected process.

According to a fifth aspect of the invention, there is provided a computer program, comprising computer readable code which, when run on a computer device, causes the computer device to behave as either a base station as described above in the second aspect of the invention, or a Software Management Repository Service server as described above in the third aspect of the invention.

DETAILED DESCRIPTION

The invention described in this document is mostly relevant for the scenario of determining the topology of an eNodeB in an LTE network, but can also be applied to other network scenarios. The invention is described in terms of eNodeBs in a LTE/SAE network and how the X2 interface can be established between these nodes by way of example only. The invention may also apply to other types of base stations and the establishment of any interface between the base stations. For example, the invention may apply to Home eNodeBs (HeNB), UTRAN nodes and UTRAN Home NodeBs (HNB). Although the current 3GPP working assumption is that X2 is not used for handover involving HeNB, this does not exclude other HeNB functions in which an X2 interface is involved.

It is assumed that an eNodeB has an active S1 interface towards the Core Network (i.e. an active S1-MME interface to a MME) before any attempts to establish an X2 interface with another eNodeB are performed. For the topology locations of eNodeBs 12 and 13, an IPsec tunnel exists between the eNodeB 12 or 13 and the SEGW 14, and the eNodeB 12 or 13 holds an Intranet IP address (as depicted in FIG. 3).

When an eNodeB 12 wishes to establish X2 interface with another eNodeB 13, it must ascertain at least the following information to be able to decide how the X2 interface is to be established, although it will be appreciated that other types of information may also be useful:
1. The topology location of the other eNodeB 13, i.e. one of Intranet, Internet without NAT, and Internet with NAT.
2. The Intranet IP address of the other eNodeB 13.
3. The Internet IP address of the other eNodeB 13 (in the case of the eNodeB 13 being located in the Internet 5 without a NAT).
4. SEGW Internet IP address (in the case of an eNodeB 13 being located in the Internet 5 behind a NAT 15).
5. SEGW Intranet IP address (in the case of an eNodeB 13 being located in the Internet 5 behind a NAT 15).

An eNodeB can find out information about its own topology location, such as whether it is located in an Intranet, the Internet without a NAT, or the Internet behind a NAT.

During initial setup of the eNodeB, the eNodeB typically contacts a Software Management Repository Service (SMRS) server (or any other server which allows the eNodeB to announce its presence to the network) to download configuration information. Two methods are suggested for the eNodeB to detect if it is located at the intranet side or at the Internet side.

According to a first method, for the eNodeB to find its topology location information, the location information is stored in an installation file alongside the necessary information for site integration. This installation file is produced by the network operator, taking into consideration network planning and ordering. This installation file can be sent to eNodeB during an auto-integration process between the eNodeB and an SMRS server.

The second method is to detect the location of the eNodeB automatically during site integration. Since a server such as a SMRS server can be located both at the Internet and at the Intranet side, it will have two IP interfaces with different IP addresses; one for the Intranet and one for the Internet. When the eNodeB connects to the SMRS, depending on the location of the eNodeB, the SMRS will be either contacted via the Intranet IP address or the Internet IP address. Depending on whether the SMRS is contacted using its Intranet IP address or its Internet IP address, the SMRS is able distinguish if the eNodeB is located at the Intranet or the Internet, and can notify the eNodeB whether it is located in the Internet or the Intranet.

An alternative method for detecting the location of the eNodeB automatically during site integration is available if the SMRS server has the capability to communicate with nodes located in both the Internet and Intranet via firewalls. In this scenario, the SMRS server will be able to determine if the eNodeB is located on an Internet or Intranet network by looking at the source address of eNodeB. The SMRS can then notify the eNodeB whether it is located in the Internet or the Intranet.

In the case that the eNodeB is located in the Internet, it must ascertain whether it is located behind a NAT 15 or not. The NAT detection is performed at an IKEv2 initial exchange. This is done when an IPSec tunnel is established between the eNodeB 13 and the SEGW 14 using NAT detection payload. This requires both the eNodeB 13 and the SEGW 14 to support IPsec with NAT traversal as described in RFC 4306.

If NAT detection is supported by both the eNodeB 13 and the SEGW 14, they will be able to exchange a NAT detection payload in the first two packets of the IKE negotiation. This can be used to detect if there is a NAT between the eNodeB and the SEGW 14.

In the case that the eNodeB 11 is located in the Intranet 6, its Intranet IP address is located at the eNodeB 11 and so is known to it as the intranet address is obtained by the eNodeB 11 when the IPsec tunnel is established between the eNodeB 11 and the SEGW 14.

The Internet IP address is only needed in the case where an eNodeB 12 is located in the Internet, and not behind a NAT. This information is also located in the eNodeB 12 and so the eNodeB 12 is already provided with information that the IP address is an Internet address.

The SEGW 14 Internet IP address is required in the case of an eNodeB 13 located in the Internet behind a NAT 15. The eNodeB 13 retrieves this information during a DNS lookup of SEGW FQDN when establishing an IPsec tunnel between the SEGW 14 and the eNodeB 13. An alternative possibility is for the eNodeB 13 to be configured with this information (i.e. SEGW IP-address instead of SEGW FQDN).

The SEGW Intranet IP address is required in the case of an eNodeB 13 located in the Internet behind a NAT 15. The SEGW 14 can provide this information to the eNodeB 13 by using the existing IKEv2 protocol in a new way: When setting up the SA from the SEGW 14 to the eNodeB 13, the SEGW 14 sends its Intranet IP address using, for example, a Configuration Payload (CP (CFG_REQUEST)). In a normal case, the eNodeB is the node requesting an address, i.e. the initiator of the IKEv2 signalling. However, this CFG_REQUEST is treated as a notification instead. The eNodeB stores the Intranet IP-address of the SEGW 14, and returns with the same address in CP(CFG_REPLY) in order to be standard compliant. Alternatively, the eNodeB 13 can trigger the SEGW 14 to provide the SEGW Intranet IP address by sending an IKE informal message with a new query for the SEGW IP address. If the SEGW understands the IKE informal message, it replies with the requested information, otherwise it simply ignores the message.

Figure 7:
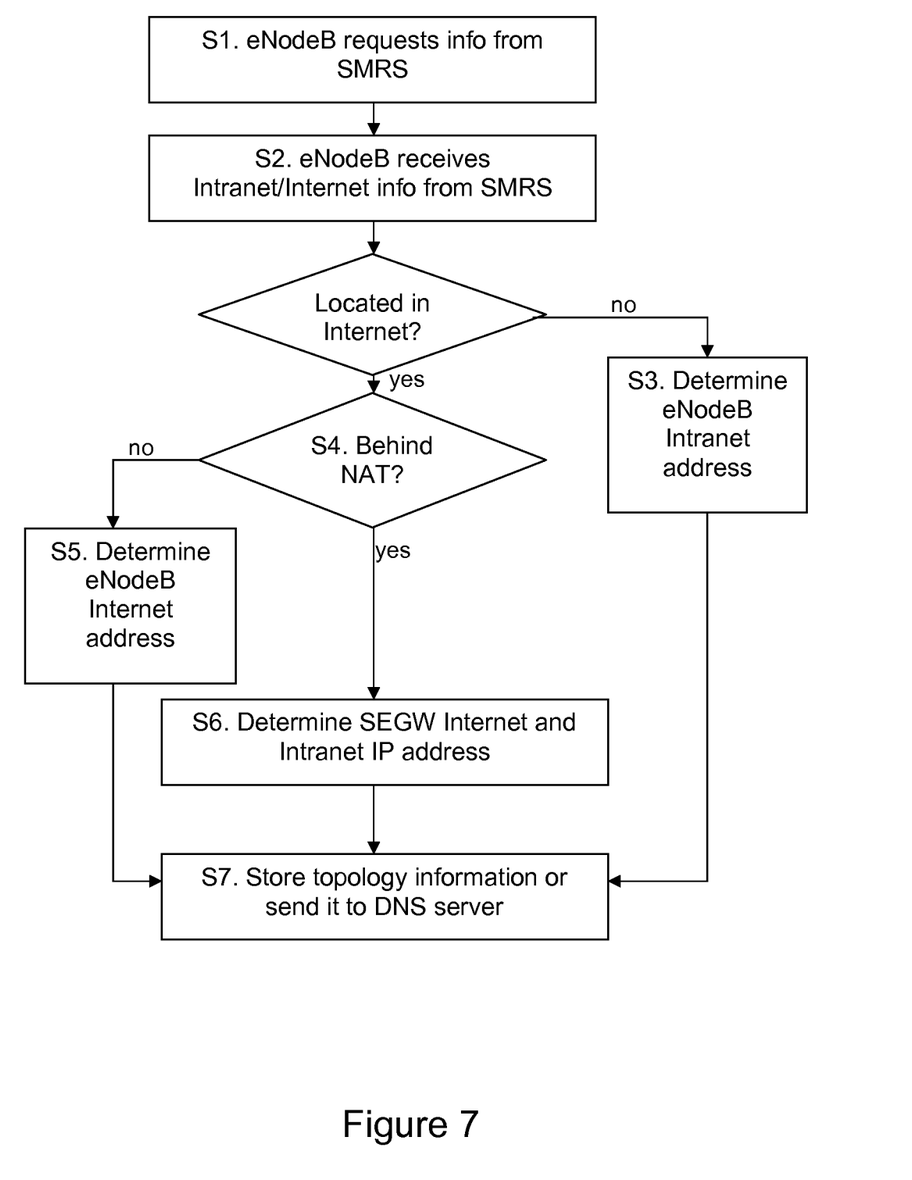
FIG. 7 is a flow diagram illustrating an embodiment of the invention.

FIG. 7 is a flow diagram summarizing certain aspects of the invention. The following numbering corresponds to the numbering in FIG. 7.

S1. The eNodeB requests topology information from an SMRS server or any other configuration node.
S2. The SMRS server sends a message to the eNodeB informing the eNodeB whether it is located in an Intranet or Internet network.
S3. If the eNodeB is located in an Intranet network, it determines its Intranet IP address. The method then proceeds at step S7.
S4. If the eNodeB is located in an Internet network, it determines whether or not it is located behind a NAT.
S5. If the eNodeB determines that it is not located behind a NAT, it determines its Internet IP address. The method then proceeds at step S7.
S6. If the eNodeB determines that it is located behind a NAT, it obtains the SEGW Internet and Intranet IP addresses.
S7. Once the eNodeB has determined its location and relevant IP addresses, it either stores this information or sends it to a database such as a DNS server.

Figure 8:
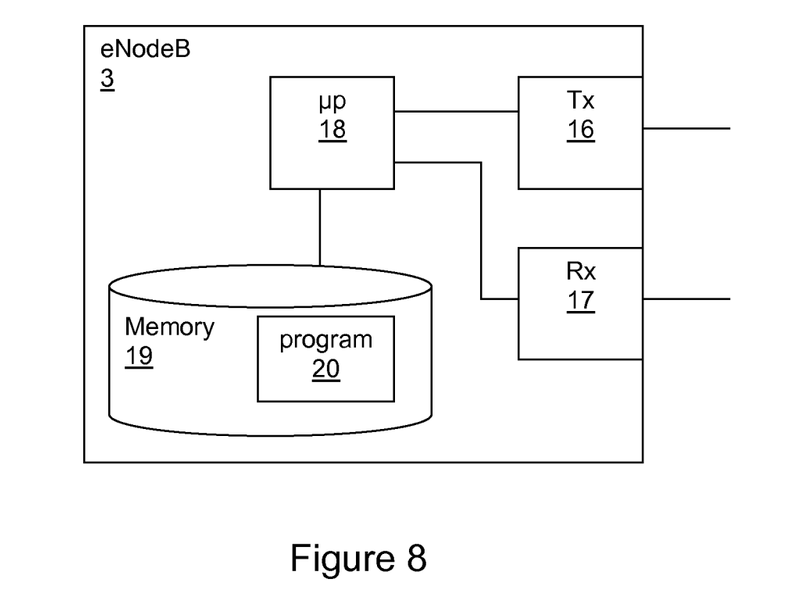
FIG. 8 is an eNodeB according to an embodiment of the invention.

Referring to FIG. 8 herein, there is illustrated an eNodeB 3 according to an embodiment of the invention. The eNodeB is provided with a transmitter 16 for sending a request for topology information to an SMRS server, and a receiver 17 for receiving a response that includes the requested topology information. A processor 18 is provided for handling signalling and message handling. A memory 19 is also provided for storing the topology information. Alternatively or additionally, the transmitter 16 may send the received topology information to a DNS server. The example of FIG. 7 shows a hardware embodiment of the invention. Of course, the same functionality may be implemented using software. The memory 19 may be used to store a software program 20 that enables the eNodeB 3 to perform the actions described above.

The processor 18 may also be arranged to determine whether the eNodeB is located behind a NAT, as described above, by comparing a received hash value of the IP address and ports of the interface used by the eNodeB with a calculated hash value.

Figure 9:
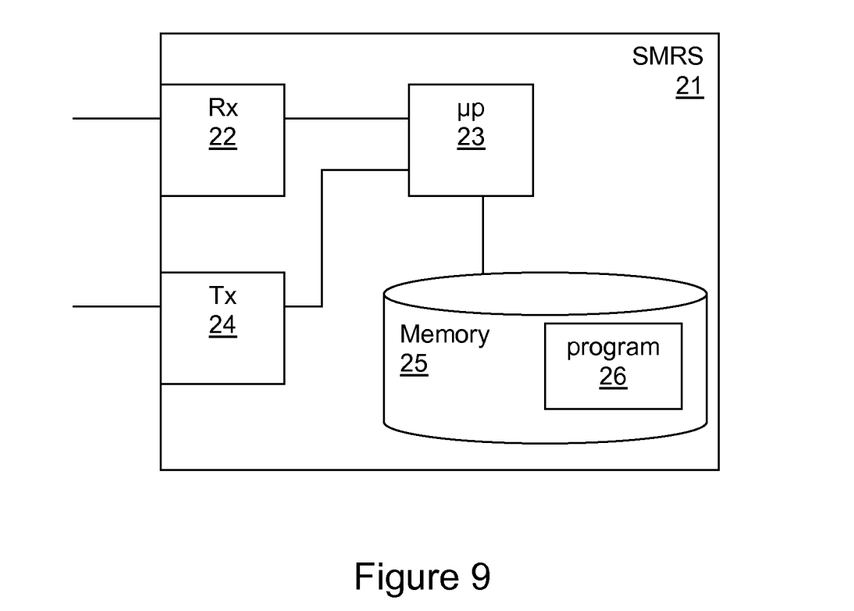
FIG. 9 is a Software Management Repository Service server according to an embodiment of the invention.

Referring now to FIG. 9 herein, there is illustrated an SMRS server 21 according to an embodiment of the invention. The SMRS server 21 is provided with a receiver 22 for receiving from the eNodeB 3 a request for topology information. A processor 23 is provided for message handling and for obtaining the required topology information by determining whether the eNodeB has contacted the SMRS server using its Internet or Intranet IP address. Alternatively, the processor may use the source address of the eNodeB 3 to determine whether the eNodeB 3 is located in an Intranet or the Internet. A transmitter 24 is provided for sending a message back to the eNodeB informing the eNodeB whether it is located in an Intranet or the Internet. A memory 25 may also be provided. Of course, the same functionality may be implemented using software. The memory 25 may be used to store a software program 26 that enables the SMRS server 21 to perform the actions described above. It will be appreciated that instead of an SMRS server, this node may be any other server which allows the eNodeB to announce its presence to the network.

Once an eNodeB has established its topology, and wishes to establish an X2 interface with another eNodeB, it must retrieve the topology information for the other eNodeB. There are two different methods for an eNodeB to lookup/retrieve the topology and other related information for another eNodeB with which it wishes to establish an X2 interface. These are a DNS Lookup method and an S1-interface method.

In the DNS lookup method (see 3GPP R3-081462), each eNodeB registers its topology and other related information that it detected as described above in a DNS server using dynamic DNS. The additional attributes (i.e. in addition to the Intranet IP address) can for example be stored in a TXT RDATA field. During an IP address lookup of the target eNodeB, the source eNodeB will send an additional DNS lookup of TXT RDATA, and the additional attributes of the target eNodeB can be retrieved. As an alternative to using DNS, a new database/protocol can be used for storing and retrieving this information.

In the S1 interface based method, signalling is sent via the Core Network and the DNS lookup method is not used. All topology and other related information is stored within the eNodeB itself. During signalling with the target eNodeB via S1AP, the source eNodeB sends the topology and other related information to the destination eNodeB using Information Elements sent between the eNodeBs that are simply forwarded by the Core Network without the Core Network acting upon them. In a returned message, the destination eNodeB sends back additional Information Elements (IEs) containing the additional attributes to the source eNodeB, i.e. the information exchange between the eNodeBs uses so-called transparent containers. An example of when the information could be transmitted in this way between source and destination eNodeBs is signalling for S1-based handover.

Once the source eNodeB has obtained the topology and other related information for the target eNodeB, it can decide how to establish an X2 interface towards the target eNodeB, which enables the possibility of optimizing the X2 IPsec handling.

Figure 10:
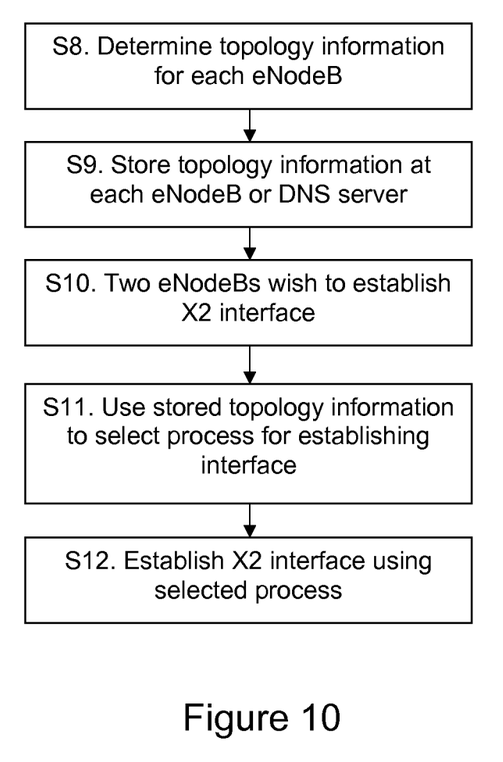
FIG. 10 is a flow diagram illustrating a further embodiment of the invention.

FIG. 10 is a flow diagram illustrating further steps according to an embodiment of the invention once two eNodeBs have established their topology. The following numbering corresponds to the numbering of FIG. 10:

S8. Each eNodeB determines its topology as described above.
S9. Topology information is stored either locally at the eNodeB or remotely at a DNS server.
S10. Two eNodeBs subsequently wish to establish an X2 interface.
S11. The stored topology information is used to select a process for establishing an X2 interface (the possible selection processes are outside the scope of this invention).
S12. An X2 interface is established using the selected process.

Whilst the above invention describes determination of location topology of an eNodeB in an LTE/SAE network, prior to setting up an X2 interface between two eNodeBs, it will be appreciated that the invention can also be applied to setting up interfaces between other types of base station in other types of networks.

The invention claimed is:

1. A method of determining the topology of a base station in a communication network, the method comprising:
   at the base station, sending a configuration request message to a configuration node;
   receiving from the configuration node information relating to the base station, the information including an indication of whether the base station is located at an Intranet or an Internet location, the information having been obtained at the configuration node by determining if a source or a destination IP address used in the configuration request message is an Intranet IP address or an Internet IP address;
determining whether the base station is located in an Intranet or an Internet location accordingly; and
   in the event that the base station is located at an Internet location, determining whether the base station communicates with a Security Gateway node via a Network Address Translation function, the determination being made during Internet Key Exchange between the base station and the Security Gateway node using Network Address Translation detection payload.

2. The method according to claim 1, further comprising:
sending a lookup message from the base station to a remote database, the lookup message requesting information relating to a further base station, the information including an indication of whether the further base station is located at an Intranet or an Internet location; and
receiving a response message from the remote database, the response message including the requested information relating to the further base station.

3. The method according to claim 1, wherein the base station is selected from any one of an eNodeB, a Home eNodeB, a UMTS Terrestrial Radio Access Network NodeB, a combined NodeB and RNC, and a UMTS Terrestrial Radio Access Network Home NodeB.

4. The method according to claim 1, wherein the configuration node is a Software Management Repository Service server.

5. The method according to claim 1, further comprising, at the configuration node, retrieving the information from a database.

6. A method of determining the topology of a base station in a communication network, the method comprising:
   at the base station, sending a configuration request message to a configuration node.
   receiving from the configuration node information relating to the base station, the information including an indication of whether the base station is located at an Intranet or an Internet location, the information having been obtained at the configuration node by determining if a source or a destination IP address used in the configuration request message is an Intranet IP address or an Internet IP address;
   at the base station, receiving from a Security Gateway, an Intranet IP address for the Security Gateway node in an Internet Key Exchange signalling message, the Intranet IP address for the Security Gateway node comprising topology information indicating that the base station is located behind a Network Address Translation function; and
   determining whether the base station is located in an Intranet or an Internet location accordingly.

7. The method according to claim 6, wherein the Intranet IP address for the Security Gateway node is received in a Configuration Payload.

8. The method according to claim 6, wherein the Intranet IP address for the Security Gateway node is received in response to the base station sending an Internet Key Exchange informal message including a request for the Intranet IP address for the Security Gateway node.

9. The method according to claim 6, further comprising sending the topology information relating to the base station to a remote database.

10. The method according to claim 9, further comprising:
   storing the topology information at the base station; and
   sending a message via an S1 interface to a further base station, the message including the topology information.

11. The method according to claim 10, wherein the message is sent using a transparent container such that a core network does not act upon information contained in the message.

12. The method according to claim 6, further comprising, at the configuration node, retrieving the information from a database.

13. The method according to claim 6, further comprising:
   sending a lookup message from the base station to a remote database, the lookup message requesting information relating to a further base station, the information including an indication of whether the further base station is located at an Intranet or an Internet location; and
   receiving a response message from the remote database, the response message including the requested information relating to the further base station.

14. The method according to claim 6 wherein the base station is selected from any one of an eNodeB, a Home eNodeB, a UMTS Terrestrial Radio Access Network NodeB, a combined NodeB and RNC, and a UMTS Terrestrial Radio Access Network Home NodeB.

15. The method according to claim 6, wherein the configuration node is a Software Management Repository Service server.

16. A base station for use in a communication network, the base station comprising:
   a transmitter for sending a configuration request message to a remote configuration node;
   a receiver for receiving from the remote configuration node information relating to the base station, the information including an indication of whether the base station is located at an Intranet or an Internet location, the information having been obtained at the configuration node by determining if a source or a destination IP address used in the configuration request message is an Intranet IP address or an Internet IP address, and determining whether the base station is located in an Intranet or an Internet location accordingly; and a processor arranged to, in the event that the base station is located at an Internet location, determine whether the base station communicates with a Security Gateway node via a Network Address Translation function using a Network Address Translation detection payload.

17. The base station according to claim 16, further comprising a memory for storing the received information relating to the base station.

18. The base station according to claim 16, wherein the transmitter is arranged to send topology information relating to the base station to a remote database.

19. The base station according to claim 16, wherein the transmitter is further arranged to send the received information relating to the base station to a further base station.

20. A base station for use in a communication network, the base station comprising:

a transmitter for sending a configuration request message to a configuration node;

a receiver for receiving from the configuration node information relating to the base station, the information including an indication of whether the base station is located at an Intranet or an Internet location, the information having been obtained at the configuration node by determining if a source or a destination IP address used in the configuration request message is an Intranet IP address or an Internet IP address;

the receiver further receiving from a Security Gateway, an Intranet IP address for the Security Gateway node in an Internet Key Exchange signalling message, the Intranet IP address for the Security Gateway node comprising topology information indicating that the base station is located behind a Network Address Translation function; and a processor for determining whether the base station is located in an Intranet or an Internet location accordingly.

* * * * *

UNITED STATES PATENT AND TRADEMARK OFFICE
CERTIFICATE OF CORRECTION

| | | |
|---|---|---|
| PATENT NO. | : 8,929,248 B2 | Page 1 of 1 |
| APPLICATION NO. | : 13/128321 | |
| DATED | : January 6, 2015 | |
| INVENTOR(S) | : Zee et al. | |

It is certified that error appears in the above-identified patent and that said Letters Patent is hereby corrected as shown below:

In the drawings:

In Fig. 4, Sheet 3 of 7, delete Tag "5" and insert Tag -- 6 --, therefor.

In the specification:

In Column 1, Line 44, delete "51-U" and insert -- S1-U --, therefor.

In Column 1, Line 48, delete "(51" and insert -- (S1 --, therefor.

In Column 2, Line 12, delete "X2" and insert -- X2 interface --, therefor.

In the claims:

In Column 10, Line 2, in Claim 6, delete "node." and insert -- node; --, therefor.

Signed and Sealed this
Twenty-ninth Day of September, 2015

Michelle K. Lee
*Director of the United States Patent and Trademark Office*